H. H. HEWITT & C. H. PAEPLOW, Jr.
HOSE COUPLING.
APPLICATION FILED AUG. 29, 1912.
1,129,979.
Patented Mar. 2, 1915.
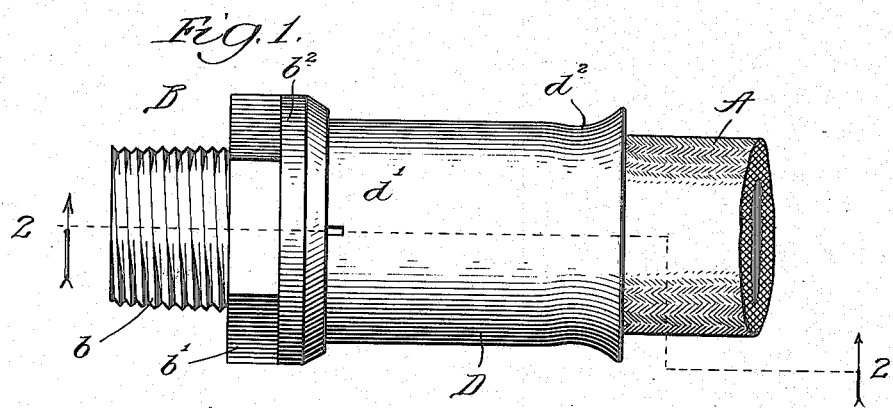
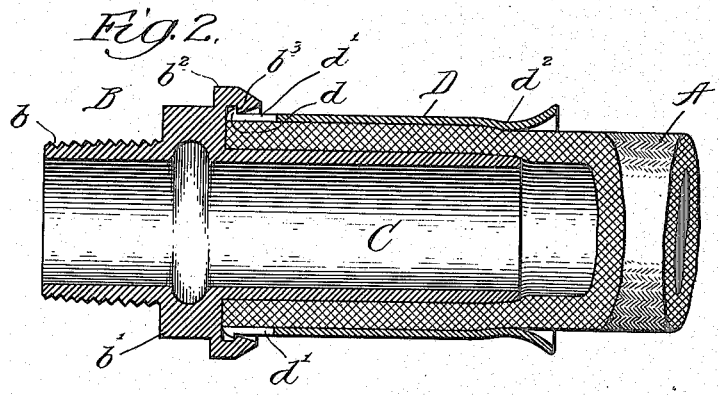
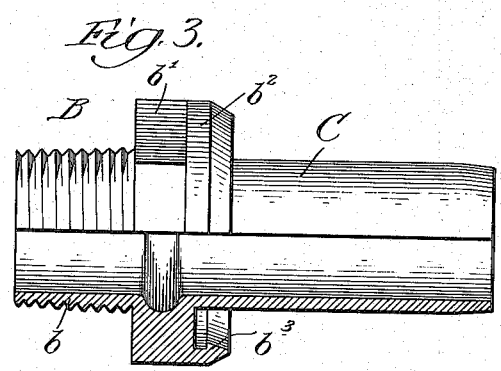 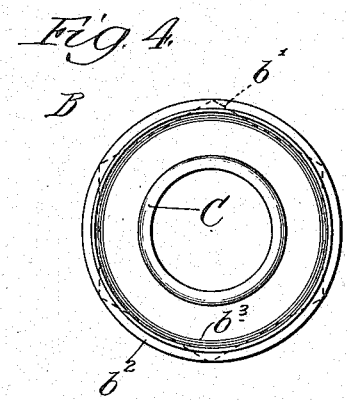
Witnesses:
Chas. H. Buell.
G. F. Chase.
Inventors:
Herbert H. Hewitt
and Charles H. Paeplow Jr.
By Peirce, Fisher & Clapp,
Attys.

UNITED STATES PATENT OFFICE.

HERBERT H. HEWITT AND CHARLES H. PAEPLOW, JR., OF BUFFALO, NEW YORK.

HOSE-COUPLING.

1,129,979.     Specification of Letters Patent.     Patented Mar. 2, 1915.

Application filed August 29, 1912. Serial No. 717,816.

*To all whom it may concern:*

Be it known that we, HERBERT H. HEWITT and CHARLES H. PAEPLOW, Jr., citizens of the United States, and residents of the city of Buffalo, county of Erie, and State of New York, have invented certain new and useful Improvements in Hose-Couplings, of which the following is a full, clear, and exact description, reference being had to the accompanying drawing, forming part of this specification.

The present invention has for its object to provide a simple and effective construction of hose coupling which, while susceptible of application in a variety of situations, is more especially designed for use in attaching the sections of air brake hose to the coupling members and train pipe nipples.

The invention consists in the features of novelty hereinafter described, illustrated in the accompanying drawing and particularly pointed out in the claims at the end of this specification.

In the drawings, Figure 1 is a view in elevation of the improved coupling. Fig. 2 is a longitudinal section thereof on the line 2—2 of Fig. 1. Fig. 3 is a view partly in elevation and partly in longitudinal section of the main body or nipple portion of the improved coupling. Fig. 4 is an end view thereof. Fig. 5 is a view partly in elevation and partly in longitudinal section of the sleeve member of the coupling.

In the accompanying drawing, A designates a section of hose that may be used for connecting one of the coupling members of an air brake hose to a nipple of the train pipe system. In the drawings we have shown our invention as applied to the nipple whereby the hose section A is connected with the train pipe, but it will be understood that the invention is equally applicable to the coupling members by which the sections of hose will be united together, or, indeed, may be used in any situation in which a section of hose is to be connected to a rigid pipe or like part.

As shown, the body of the nipple B is provided with the usual threaded portion $b$ adapted to engage the train pipe, the body of the nipple being preferably formed with a polygonal portion $b'$ to enable it to be conveniently turned by a wrench. From the body of the nipple B projects a reduced shank C over which the end of the hose A will be drawn. At the inner end of the shank C the body B of the nipple is formed with a shoulder $b^2$, from which extends an inwardly turned flange or projection $b^3$ adapted to engage with a corresponding flange or offset $d$ on the inner end of the sleeve D. Preferably, the flange or projection $b^3$ of the nipple is annular, and, preferably also the flange or offset $d$ at the inner end of the sleeve D is annular, although such construction is not essential.

In order to enable the flange or offset $d$ of the sleeve D to engage the flange or projection $b^3$ of the nipple, the inner portion of the sleeve D is slotted, so that such portion of the sleeve may be contracted after the hose has been placed upon the shank and the sleeve D has been moved inward to engage the body of the nipple, in manner to be presently described. Preferably, the slots in the inner portion of the sleeve D are formed, as shown in the drawings—that is to say, there will be a series of short slots $d'$ extending lengthwise of the sleeve. The precise form and arrangement of the slots, however, are not essential. By preference the face of the flange or offset $d$ of the sleeve D and the face of the flange or offset $b^3$ of the nipple B are beveled so as to enable these parts to be more readily engaged one with the other.

As shown, the sleeve D is somewhat longer than the shank C of the nipple and the free end of the sleeve is contracted slightly at a point just beyond the end of the shank, as at $d^2$, so that when the parts are assembled and in position for use the contracted portion of the sleeve will firmly hold the hose by compressing or squeezing it between the end of the shank and the contracted portion of the sleeve, thereby preventing the hose from becoming detached from the shank of the coupling by being pulled or drawn off. As shown also, the extreme free end of the sleeve D is flared or bell-shaped, in order that the hose may not become kinked in bending over the edge of the sleeve and may not be cut or injured at such point.

In assembling the parts, the sleeve D will first be slipped over the hose A, the free end of which will then be forced over the shank C of the nipple or part to which our invention is applied. The sleeve D will then be pushed toward the end of the hose and toward the nipple so as to encircle both the hose and the shank C. By means of a suitable clamp or tool, the inner slotted portion of the sleeve D will then be compressed and contracted so as to enable the flange or offset $d$ to pass under the flange or projection $b^3$ of the nipple B, as the sleeve D is forced against the shoulder $b^2$ of the nipple. As soon as the pressure of the clamp or tool is released, the flange or offset $d$ of the sleeve D will spring outward (by reason of the elasticity of the metal of which the sleeve D is composed) until the flange or offset $d$ enters the annular space between the flange or projection $b^3$ and the shoulder $b^2$ of the nipple. When the parts are in this position, the sleeve D will be firmly interlocked with the body of the nipple. When the sleeve D is thus forced to position to interlock with the body of the nipple, the contracted outer end of the sleeve D will firmly compress the hose against the free end of the shank C and all danger of the hose pulling off or blowing off is effectively guarded against. When the hose A is to be detached from the nipple B, this can be readily accomplished by contracting the inner portion of the sleeve D and moving the sleeve outwardly to disengage its shoulder or offset $d$ from the flange or projecting part $b^3$ of the body of the nipple.

Not only does our invention provide an exceedingly simple and effective means for gripping and holding the hose upon the shank of the nipple or other part to which it is to be connected, but it also affords a most efficient means for protecting the end portion of the hose, so that the hose cannot be bruised or jammed against the shank of the nipple or other part on which it is mounted.

We wish it distinctly understood that the details of construction above set out may be varied without departing from the spirit of the invention, and that features of the invention may be employed without its adoption as an entirety.

Having thus described our invention, what we claim as new and desire to secure by Letters Patent, is:—

1. A hose coupling comprising a metal body having a rigid shank adapted to enter the end of the hose and an exterior shoulder at the inner end of the shank provided with an interlocking flange, and a retaining sleeve encircling said shank with the hose thereon and having a coöperating interlocking flange at its inner end, said sleeve being longer than said shank and provided with an annular contracted portion at its outer end, said sleeve having a sliding movement in a straight axial direction to thereby interlock said flanges and compress the hose between said annular contracted portion and the outer end of said shank, substantially as described.

2. A hose coupling comprising a metal body having a rigid shank adapted to enter the end of the hose and an external cylindrical shoulder at the inner end of said shank provided with a laterally projecting, beveled interlocking flange, and a retaining sleeve encircling said shank with a hose thereon and having a longitudinally slotted inner end provided with an interlocking flange adapted to engage the flange of said shoulder, said sleeve being longer than said shank and provided with an annular contracted portion adjacent its outer end, and said sleeve having a sliding movement in said axial direction to thereby interlock said flanges and compress the hose between said annular contracted portion and the outer end of said shank, substantially as described.

3. A hose coupling comprising a metal body having a substantially cylindrical, rigid shank provided with a convexly rounded outer end, said body having an exterior cylindrical shoulder at the inner end of said shank and provided with a laterally projecting, beveled interlocking flange, and a substantially cylindrical retaining sleeve adapted to encircle said shank with a hose thereon and having a slotted inner end provided with a beveled interlocking flange adapted to coöperate with the interlocking flange of said shoulder, said sleeve being longer than said shank and provided with an annular contracted portion adjacent its outer end and forming an internal rib having an inner, convexly rounded surface, said sleeve having a sliding movement in straight axial direction to thereby interlock said flanges and compress the hose between said rib and the convexly rounded outer end of said rigid shank, substantially as described.

HERBERT H. HEWITT.
CHARLES H. PAEPLOW, Jr.

Witnesses:
FRANK H. VAN DERBECK,
PERCY P. TEAL.